(12) United States Patent
Tsuda

(10) Patent No.: US 11,144,768 B2
(45) Date of Patent: Oct. 12, 2021

(54) IMAGE PROCESSING DEVICE AND IMAGE PROCESSING METHOD

(71) Applicant: NEC Corporation, Tokyo (JP)

(72) Inventor: Shunsuke Tsuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 16/735,779

(22) Filed: Jan. 7, 2020

(65) Prior Publication Data

US 2020/0234060 A1 Jul. 23, 2020

(30) Foreign Application Priority Data

Jan. 17, 2019 (JP) .............................. JP2019-006218

(51) Int. Cl.
*H04N 5/228* (2006.01)
*G06K 9/00* (2006.01)
*H04N 5/232* (2006.01)
*H04W 12/06* (2021.01)
*G06T 3/40* (2006.01)

(52) U.S. Cl.
CPC ............ *G06K 9/00778* (2013.01); *G06T 3/40* (2013.01); *H04N 5/23229* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 10,044,985 B1 * | 8/2018 | Parker | ................ | H04N 5/22541 |
| 2003/0185419 A1 * | 10/2003 | Sumitomo | ......... | H04N 5/23206 |
| | | | | 382/103 |
| 2007/0109411 A1 | 5/2007 | Jung et al. | | |
| 2010/0265354 A1 * | 10/2010 | Kameyama | ............ | H04N 19/33 |
| | | | | 348/222.1 |
| 2013/0063616 A1 * | 3/2013 | Ishii | .................... | H04N 5/23267 |
| | | | | 348/208.6 |
| 2013/0243253 A1 * | 9/2013 | Demizu | ............. | G06K 9/00624 |
| | | | | 382/103 |
| 2014/0184841 A1 * | 7/2014 | Woo | ...................... | H04N 5/2257 |
| | | | | 348/218.1 |
| 2016/0219227 A1 * | 7/2016 | Sato | .................... | H04N 5/23229 |
| 2016/0381013 A1 | 12/2016 | Buscemi | | |
| 2017/0294038 A1 * | 10/2017 | Moriya | ................ | H04N 5/2628 |
| 2019/0012547 A1 * | 1/2019 | Togashi | ............. | G06K 9/00778 |

FOREIGN PATENT DOCUMENTS

| | | |
|---|---|---|
| JP | 2008-219467 A | 9/2008 |
| JP | 2013-012893 A | 1/2013 |
| JP | 2014-089625 A | 5/2014 |
| JP | 2014089625 A * | 5/2014 |

* cited by examiner

*Primary Examiner* — Howard D Brown, Jr.
(74) *Attorney, Agent, or Firm* — Sughrue Mion, PLLC

(57) ABSTRACT

An image processing device is configured to record a captured image acquired from an imaging device, to detect a monitor request made by a user with respect to a monitored object reflected in the captured image, to specify the monitored object in the captured image according to the monitor request, and to generate an output image including the monitored object such that the user can monitor the monitored object in the output image. Accordingly, it is possible to provide the user with the output image including an enlarged image of the monitored object, and it is possible to record captured images each normally covering a prescribed wide imaging range on storage media.

9 Claims, 4 Drawing Sheets

FIG. 2
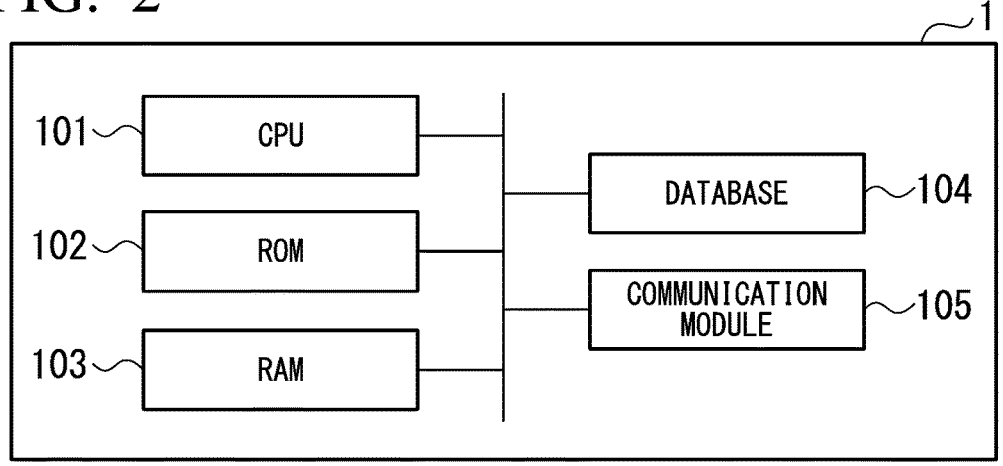
FIG. 3
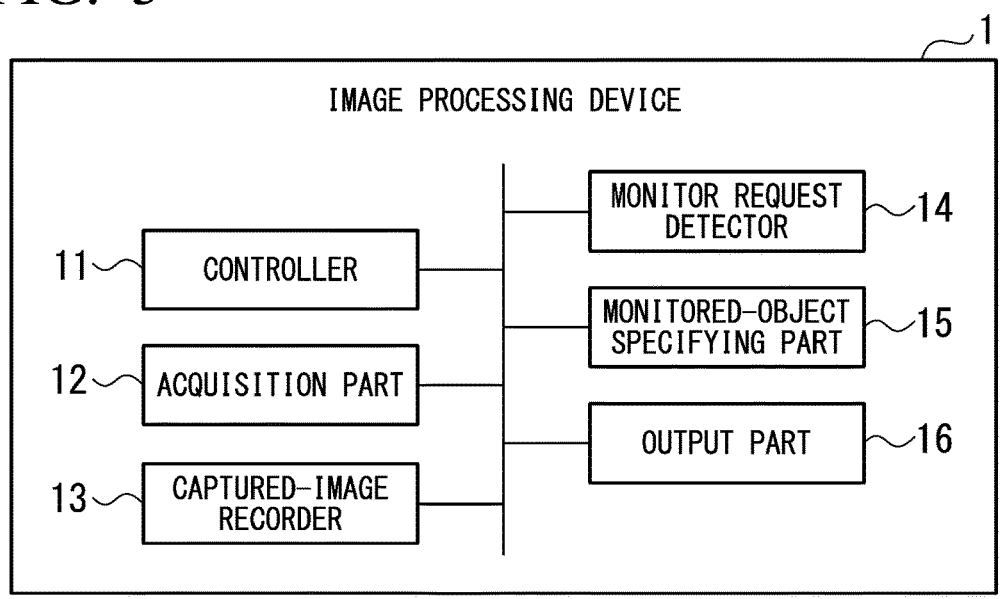
FIG. 4
| USER ID | BIOMETRIC CHARACTERISTIC INFORMATION | PRIVACY-PROTECTION FLAG | ... |
|---|---|---|---|
| ... | ... | ... | ... |
| ... | ... | ... | ... |
| ... | ... | ... | ... |

IMAGE PROCESSING DEVICE AND IMAGE PROCESSING METHOD

CROSS-REFERENCE TO RELATED APPLICATION

The present application claims the priority benefit of Japanese Patent Application No. 2019-6218 filed on Jan. 17, 2019, the subject matter of which is hereby incorporated herein by reference.

BACKGROUND OF THE INVENTION

1. Field of the Invention

The present invention relates to an image processing device and an image processing method.

2. Description of Related Art

Recently, many imaging devices configured to capture monitored objects (e.g. persons, products, or properties) have been located at many places. Users doing monitoring objects (e.g. watchmen, inspectors, or observers) may observe images captured by imaging devices to confirm the state of a monitored object. For example, a monitoring system is introduced for the purpose of users (e.g. parents who need to watch children) to monitor children left in nursery with caregivers. Users may use terminal devices (e.g. smartphones) to communicate with a monitoring system so as to display images capturing children on screen, thus confirming the state of children.

Patent Document 1 discloses a person image searching method configured to share and search images in consideration of privacy protection. This method is configured to search for a database holding personal characteristic information using a search key having a facial photograph of a person while taking privacy protection measures for other facial images of other persons. Patent Document 2 discloses an image conversion method configured to enlarge or reduce part of panorama pictures using different enlargement ratios at desired regions of panorama pictures. Patent Document 3 discloses an automatic tracking method configured to capture objects in an enlarged manner while automatically tracking objects. Patent Document 4 discloses a technique to process captured images derived from selected target objects in a field of view combined with a zoom-in close-up lens. Patent Document 5 discloses a method configured to allow users to preserve privacy and control the use of individual images and/or personal information, wherein if not authorized the use of individual images, a privacy control server may generate modified images instead of individual images.

3. Patent Documents

Patent Document 1: Japanese Patent Application Publication No. 2014-89625
Patent Document 2: Japanese Patent Application Publication No. 2013-12893
Patent Document 3: Japanese Patent Application Publication No. 2008-219467
Patent Document 4: US 2007/0109411 A1
Patent Document 5: US 2016/0381013 A1

4. Technical Problem

A monitoring system may be given a user instruction to enlarge and display part of images reflecting monitored objects. To generate an enlarged image reflecting a monitored object, it is possible to carry out zoom-in control to reduce a viewing angle by increasing a focal distance. Due to the narrowed viewing angle, it is difficult for the monitoring system to generate images each normally covering a prescribed wide imaging range, and therefore it is impossible to record captured images of objects each normally covering a prescribed wide imaging range irrespective of zoom-in control. However, none of the related arts provides any solutions to this problem.

The present invention is made under the aforementioned circumstances, and therefore the present invention aims to provide an image processing device and an image processing method to solve the problem.

SUMMARY OF THE INVENTION

In a first aspect of the invention, an image processing device including a captured-image recorder configured to record a captured image acquired from an imaging device; a monitor request detector configured to detect a monitor request made by a user with respect to a monitored object reflected in the captured image; a monitored-object specifying part configured to specify the monitored object in the captured image according to the monitor request; and an output part configured to generate an output image including the monitored object such that the user can monitor the monitored object in the output image.

In a second aspect of the invention, an image processing method includes the steps of: recording a captured image acquired from an imaging device; detecting a monitor request made by a user with respect to a monitored object reflected in the captured image; specifying the monitored object in the captured image according to the monitor request; and generating an output image including the monitored object such that the user can monitor the monitored object in the output image.

According to the present invention, it is possible to provide users with captured images of objects designated by users in an enlarged manner and normally covering a prescribed wide imaging range, thus recording desired images of objects on storage media.

BRIEF DESCRIPTION OF THE DRAWINGS

FIG. 2 is a block diagram showing a hardware configuration of an image processing device according to one embodiment of the present invention.

FIG. 3 is a block diagram showing a functional configuration of the image processing device according to one embodiment of the present invention.

FIG. 4 shows a table describing various pieces of information stored on a database installed in the image processing device according to one embodiment of the present invention.

DETAILED DESCRIPTION OF THE EMBODIMENT

Figure 1:
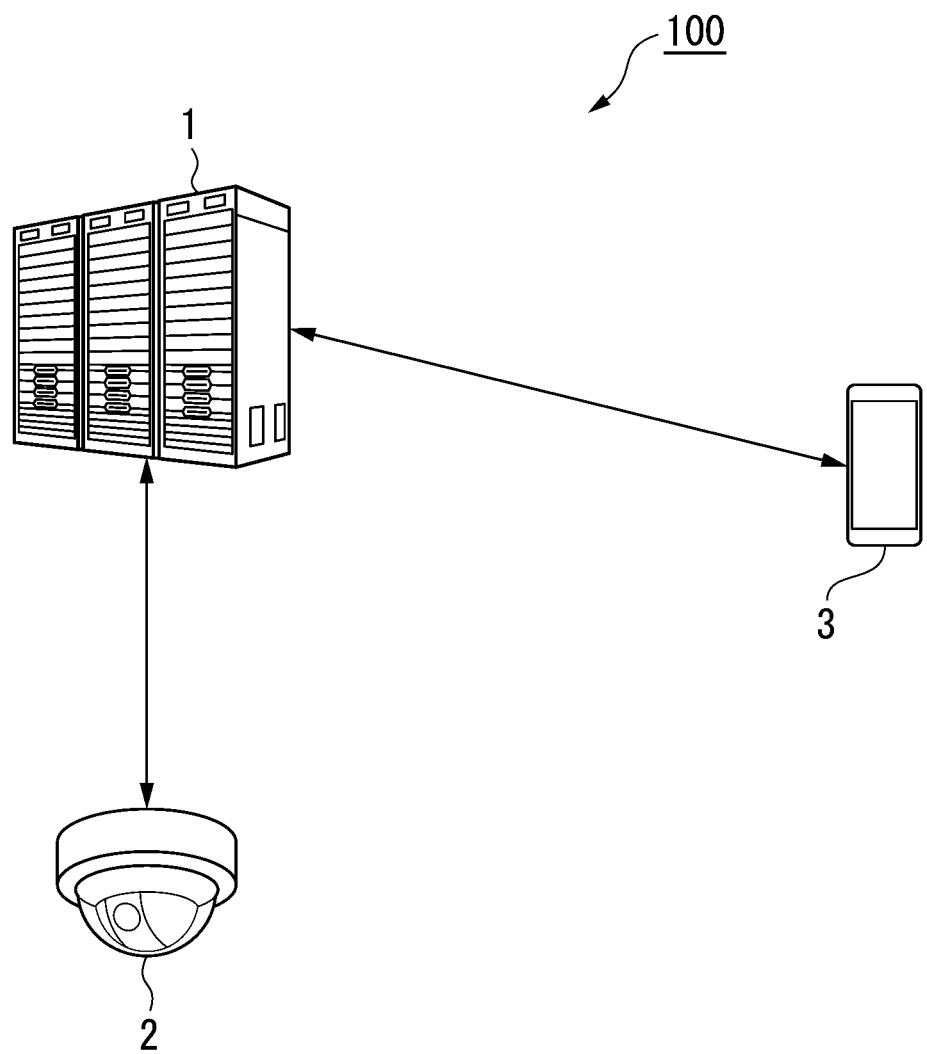
FIG. 1 is a block diagram of an image processing system according to one embodiment of the present invention.

The present invention will be described in detail by way of embodiments with reference to the drawings. FIG. 1 is a block diagram of an image processing system (i.e. a monitoring system 100) including an image processing device according to one embodiment of the present invention. The monitoring system 100 includes an image processing device 1 and a camera 2, and a terminal 3. The image processing device 1 communicates with the camera 2 to receive a captured image. The terminal 3 is configured to receive or send information with the image processing device 1.

FIG. 2 shows a hardware configuration of the image processing device 1 which include various hardware components such as a CPU (Central Processing Unit) 101, a ROM (Read-Only Memory) 102, a RAM (Random-Access Memory) 103, a database 104, and a communication module 105. The image processing device 1 receives captured images from the camera 2 to record captured images on the database 104.

FIG. 3 is a block diagram showing the functional configuration of the image processing device 1. The image processing device 1 carries out an image processing program stored on storage media in advance, thus realizing various functional parts such as a controller 11, an acquisition part 12, a captured-image recorder 13, a monitor request detector 14, a monitored-object specifying part 15, and an output part 16.

The controller 11 is configured to control other functional parts. The acquisition part 12 is configured to acquire or receive images captured by the camera 2 and to further receive information transmitted from other devices such as the terminal 3. The captured-image recorder 13 is configured to record on the database 104 the captured images acquired by the acquisition part 12. The monitor request detector 14 is configured to detect a monitor request from a user who needs to monitor a monitored object reflected in the captured images. The monitored-object specifying part 15 is configured to specify the position of a monitored object in the captured image being monitored by the user according to the monitor request. The output part 16 is configured to generate an output image including a monitored object and thereby output it to the user such that the user can monitor the output image. For example, the output part 16 transmits the output image to the terminal 3 held by the user.

According to the present embodiment, the image processing device 1 generates the output image in which a display ratio of a monitored object will be higher than a display ratio of the captured image. For example, the monitored object is a predetermined person being monitored by the user. Based on characteristics of a person specified according to the monitor request, the image processing device 1 specifies the monitored object being monitored by the user. In this connection, when the output image includes a predetermined monitored object different than the monitored object being monitored by the user, the image processing device 1 may carry out a process to obscure the display area of the predetermined monitored object. In addition, the image processing device 1 may generate replication data of the captured image for each user so as to generate the output image from the replication data. Alternatively, the image processing device 1 may divide the captured image into a plurality of divided regions so as to specify a divided region (i.e. any one of divided regions) specifying a monitored object, thus generating the output image based on the image data of the divided region.

Accordingly, the image processing device 1 is able to provide the user with the output image displaying the monitored object designated by the user in an enlarged manner and to record the captured image normally covering a prescribed wide imaging range.

When a person is selected as the monitored object or another predetermined monitored object, the image processing device 1 is able to generate the output image including an enlarged image of a person (i.e. a monitored object designated by the user) in an understandable manner and to ensure privacy protection due to the process of obscuring the other person when reflected in the output image.

Since the output image is configured of image data replicating the captured image, it is possible to directly record the captured image including a prescribed imaging range on recording media, thus implementing a process to prevent an unrecorded region within the prescribed imaging range.

When the camera 2 has a viewing angle of 180 degrees or more like a fisheye lens, it is possible to record the captured image normally covering a prescribed wide imaging range using one or few cameras 2 located at predetermined positions.

FIG. 4 shows a table describing various pieces of information stored on the database 104. The database 104 is configured to hold the characteristic information of a person designated by a user in advance. The database 104 is configured to store the biometric characteristic information of a person designated by the user in connection with the user ID. For example, the biometric characteristic information represents the facial characteristic information. For example, the user may set a flag of privacy protection to inhibit the other user's terminal 3 to browse an image capturing a face of a person designated by the user. With the privacy protection setting, the user may store on the database 104 the biometric characteristic information of a person designated by the user and the privacy-protection flag in connection with the user ID.

Figure 5:
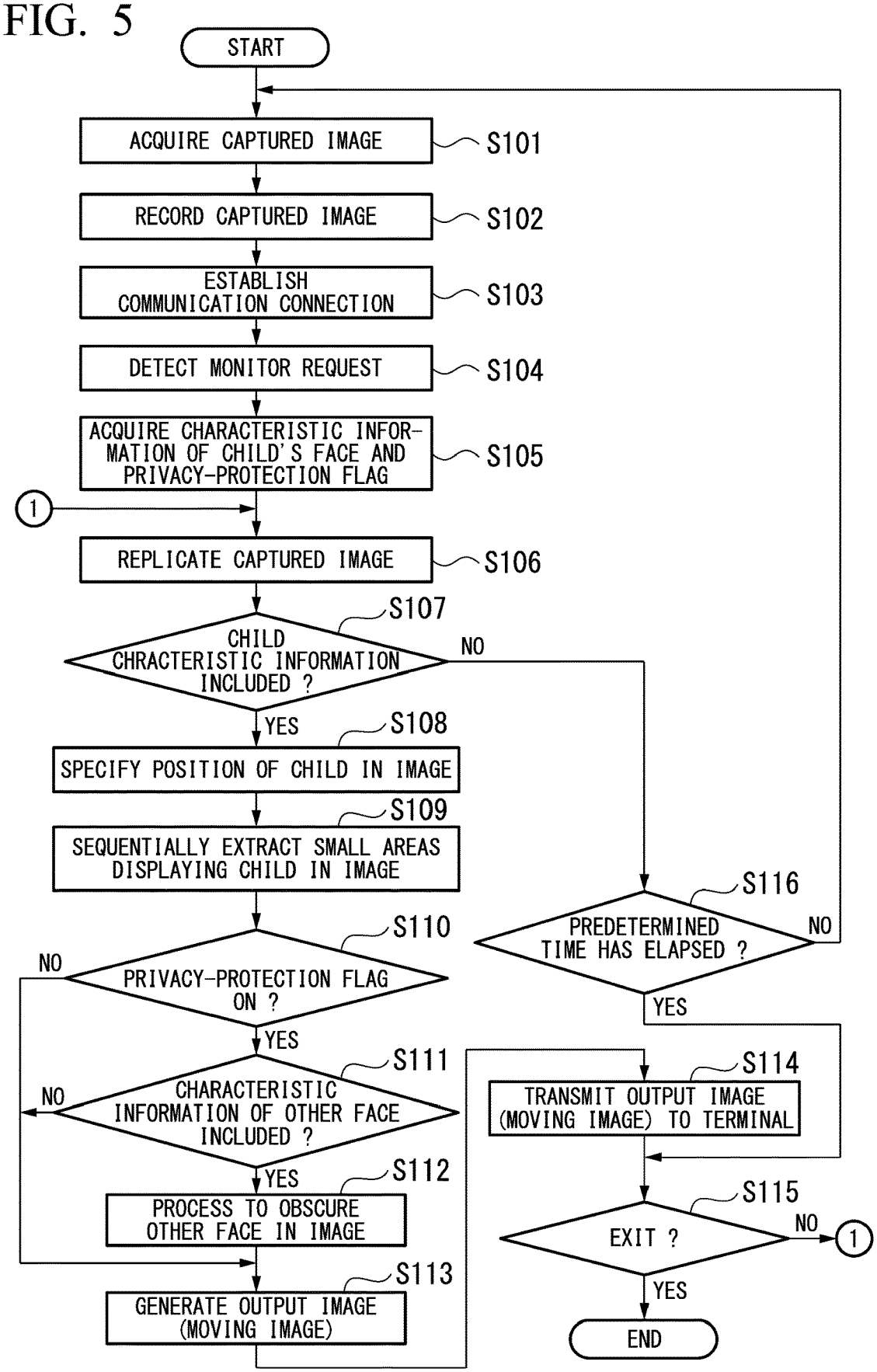
FIG. 5 is a flowchart showing the processing of the image processing device according to one embodiment of the present invention.

FIG. 5 is a flowchart showing the processing of the image processing device 1. For example, the monitoring system 100 is set up in a nursery such that the camera 2 is located in a nursery room. The camera 2 has a fisheye lens having a viewing angle of 180 degrees or more in the room. The camera 2 is configured to capture an image of the room and to transmit the captured image to the image processing device 1. The image processing device 1 receives the captured image from the camera 2, wherein the captured image is configured of moving images whereas the captured image can be configured of a still image. The image processing device 1 sequentially receives configuration data of the captured images from the camera 2.

The acquisition part 12 of the image processing device 1 acquires the captured image (step S101). The acquisition part 12 outputs the captured image to the captured-image recorder 13. The captured-image recorder 13 sequentially acquires configuration data of captured images to generate and record moving images (based on captured images) on the database 104 (step S102).

The image processing device 1 has a web-server function, according to which the image processing device 1 may receive a request of information from the terminal 3 to deliver the requested information to the terminal 3. In the present embodiment, a monitor request may represent the request of information transmitted from the terminal 3 to the image processing device 1 while the output image reflecting a monitored object such as a person designated by the user (which is generated based on the captured image of the camera 2) may represent the delivered information.

Upon receiving an access from the terminal 3, the image processing device 1 establish communication with the terminal 3 (step S103). The user operates the terminal 3 to make a monitor request for monitoring the user's child in the nursery, and therefore the terminal 3 transmits the monitor request to the image processing device 1. The monitor request includes at least the user ID. When the image processing device 1 receives the monitor request, the acquisition part 12 acquires and sends the monitor request to the monitor-request detector 14. According to the monitor request, the monitor request detector 14 detects that the monitor request is made by the user of the terminal 3 (step S104). The monitor request detector 14 retrieves the user ID from the monitor request so as to send the user ID to the monitored-object specifying part 15.

The monitored-object specifying part 15 acquires the characteristic information representative of a face of a user's child and the privacy-protection flag which are stored on the database 104 in connection with the user ID (step S105). In addition, the monitored-object specifying part 15 replicates the captured image stored on the database 104 (step S106). Due to sequential accumulation of moving images added with new images, the monitored-object specifying part 15 sequentially replicate newly-added captured images to produce replication data.

The monitored-object specifying part 15 determines whether the characteristic information of a child designated by the user is included in each of still images constituting the newest moving image among moving images representing the replication data of captured images (step S107). The monitored-object specifying part 15 sequentially specify still images constituting the newest moving image captured in a predetermined period so as to repeat the process to determine whether the characteristic information of a child designated by the user is included in each still image. When the characteristic information of the user's designated child is included in a still image, the monitored-object specifying part 15 specifies the position of the user's designated child in the still image (step S108). Subsequently, the monitored-object specifying part 15 outputs to the output part 16 the still image including the characteristic information of the user's designated child, the position (or coordinates) indicating the characteristic information of the user's designated child, and the privacy-protection flag. The monitored-object specifying part 15 determines whether a predetermined period has elapsed after the step S107 for determining that the still image does not include the characteristic information of the user's designated child (step S116). Upon determining a lapse of the predetermined period, the flow proceeds to step S115.

Figure 6:
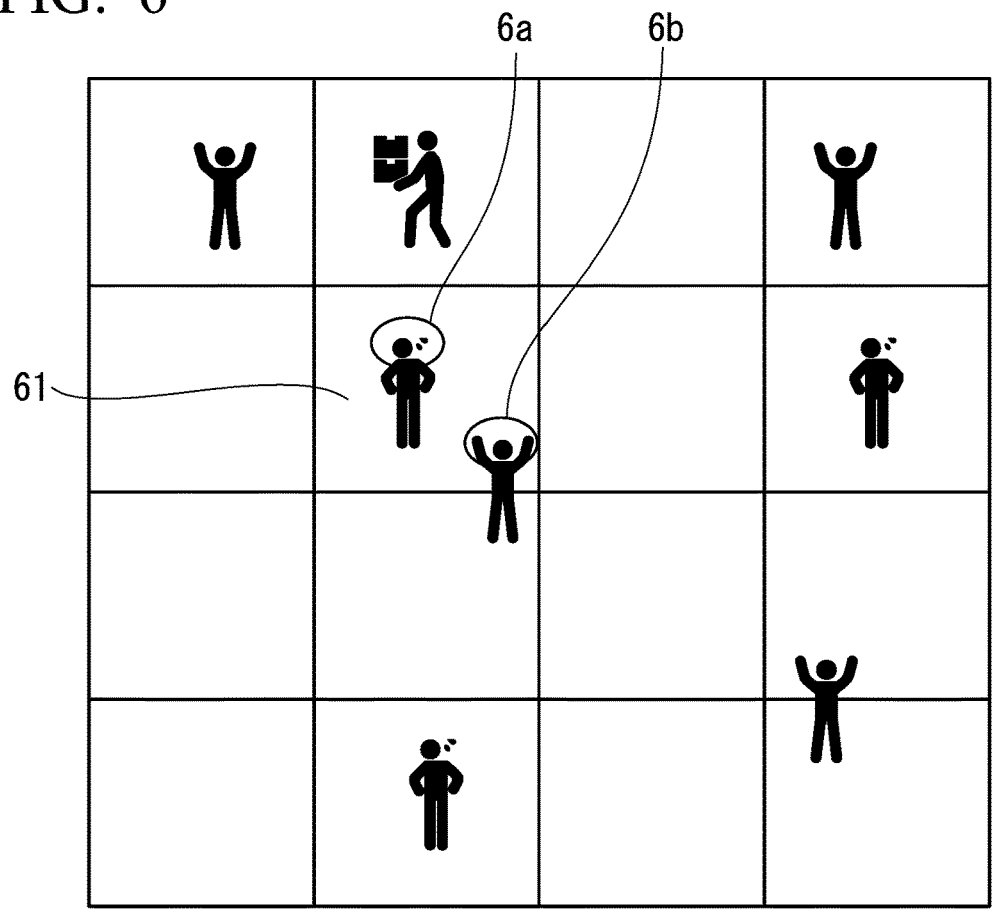
FIG. 6 is a drawing used to explain the outline of a process to generate an output image such as a moving image.

FIG. 6 is a drawing used to explain the outline of a process to generate an output image such as a moving image. For example, the output part 16 divides the entire display area of the captured image in a 4×4 manner in longitudinal and lateral directions so as to produce sixteen divided areas (i.e. sixteen small areas), thus determining whether the child characteristic information is located in each area. The output part 16 determines the small area locating the child characteristic information based on the position (or coordinates) of the child characteristic information, thus producing a still image covering the area locating the child characteristic information. For example, the output part 16 generates a still image representative of a small area denoted by reference symbol 61 in FIG. 6. The small area 61 displays two children 6a, 6b, between which 6a may represent a person specified based on the characteristics of the user's designated child. The small area 61 may include other children.

The output part 16 sequentially acquires still images including the characteristic information of the user's designated child from the monitored-object specifying part 15 as well as the position (or coordinates) indicating the child characteristic information in each still image. In the still image, the output part 16 detects the position indicating the child characteristic information and then sequentially extracts small areas of images displaying the child based on the detected position (step S109).

The output part 16 determines whether the privacy-protection flag is "ON" (step S110). When the privacy-protection flag is "ON", the output part 16 determines whether the output image (e.g. a moving image) includes the characteristic information of other person's faces different from the characteristic information of the user's designated child (step S111). When the output image includes the characteristic information of other' persons faces (e.g. the facial characteristics of the child 6b in FIG. 6), the output part 16 carries out an obscuring process to randomly convert pixel values and thereby obscure a facial region of the other person's face (step S112). This makes other faces than the face of the user's designated child, and therefore it is possible to ensure privacy protection with respect to other children than the child whom the user needs to monitor.

Specifically, the output part 16 generates an output image (i.e. a moving image) sequentially connecting still images (step S113), and therefore it is possible to generate the moving image including an enlarged image of the child's face. When the captured image is generated according to the 8K UHDTV (Ultra-High-Definition Television) specification and divided into sixteen small areas, for example, each small area represents a moving image having the same quality as the Full HD (High Definition) specification. The output part 16 transmits the output image (i.e. the moving image) to the terminal 3 (step S114). Upon receiving the output image, the terminal 3 displays the output image on screen. Accordingly, the user is able to monitor the state of the user's child using the terminal 3.

The controller 11 determines whether to exit the process (step S115). Upon receiving a user's logout request from the terminal 3, the controller 11 determines to exit the process. Alternatively, the controller 11 may exit the process when a predetermined time has elapsed after step S116 for determining that the output image does not include the child's characteristic information. When the controller 11 does not exit the process, the controller 11 repeats a series of steps starting with step S106.

Upon receiving a plurality of monitor requests from different users in the above process, the monitored-object specifying part 15 should carry out the same process for each user. That is, the monitored-object specifying part 15 generates a plurality of replication data in correspondence with the number of users so as to carry out the same process using a plurality of replication data representing a plurality of captured images in parallel. Accordingly, it is possible for each user to monitor the user's child according to the user's own monitor request even when other users operate their terminals 3 to make monitor requests to access the image processing device 1.

According to the above process, it is possible to record captured images without being processed at all on the database 104. Therefore, the image processing device 1 is able to provide users with output images and to record captured images each normally covering a prescribed wide imaging range.

According to the aforementioned process in which an output image (e.g. a moving image) includes the characteristic information representing other faces than the characteristic information of the user's designated child, it is possible to randomly convert pixel values and to thereby obscure regions of other faces in the output image. That is, it is possible to obscure other faces than the user's designated face, and therefore it is possible to ensure privacy protection with respect to other children than the child whom the user needs to monitor.

When the camera 2 has a fisheye lens having a viewing angle of 360 degrees, it is possible to record a captured image normally covering a prescribed wide imaging range using a single or few cameras 2. In addition, it is possible for each user to confirm an output image (e.g. a moving image) including an enlarged image of the user's child, thus monitoring the state of the user's child.

The foregoing descriptions refer to the monitoring system 100 installed in a nursery, however, it is possible to set up the monitoring system 100 in other places such as stores. In addition, it is possible to set up the monitoring system 100 at a predetermined position to monitor a plurality of stores. In this connection, the image processing device 1 may specify other monitored objects than persons in captured images. When the user designated a monitored object representing a bag held by the user, for example, the image processing device 1 generates an output image (e.g. a moving image) configured to enlarge an image of an object such as a bag designated by the user according to a monitor request, thus sending the output image to the terminal 3. According to the process, for example, the image processing device 1 may output to a certain device designated by the user an output image (e.g. a moving image) used to monitor a predetermined object such as a bag designated by the user in an event venue.

Figure 7:
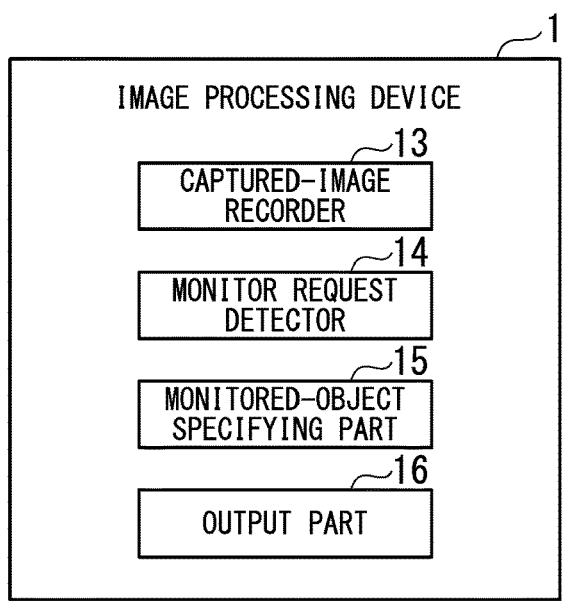
FIG. 7 is a block diagram showing the minimum configuration of the image processing device according to one embodiment of the present invention.

FIG. 7 is a block diagram showing the minimum configuration of the image processing device 1, which may include a limited number of functional parts, e.g. at least the captured-image recorder 13, the monitor request detector 14, the monitored-object specifying part 15, and the output part 16. The captured-image recorder 13 is configured to record captured images acquired from an imaging device. The monitor request detector 14 is configured to detect a monitor request made by a user who needs to monitor captured images. The monitored-object specifying part 15 is configured to specify a monitored object, which the user needs to monitor according to the monitor request, in captured images. The output part 16 is configured to generate an output image including a monitored object and to provide the output image to the user such that the user can monitor the monitored object in the output image.

In the foregoing embodiment, the image processing device includes a computer system therein, and therefore programs achieving the foregoing functions and processes are stored on computer-readable storage media; hence, the computer system reads and execute programs to implement the foregoing functions and processes. Herein, computer-readable storage media may refer to magnetic disks, magneto-optical disks, CD-ROM, DVD-ROM, semiconductor memory or the like. In addition, it is possible to deliver computer programs to computers through communication lines, and therefore computers may execute programs.

The foregoing programs may achieve part of the foregoing functions. Alternatively, the foregoing programs may be differential files (or differential programs), which can be combined with pre-installed programs of a computer system to achieve the foregoing functions.

The present embodiment relates to a monitoring system configured to monitor an object (e.g. a person) using an image captured by a camera located at a predetermined position such as a nursery room. However, the monitoring system can set up in various sites such as airports, railway stations, distribution centers, stores, public facilities, private facilities, convention halls and the like. In addition, the monitoring system can monitor various types of objects such as visitors, passengers, customers, luggage, packets, products and the like. Therefore, the monitoring system, the image processing device, and the image processing method can be modified in various ways according to their locations, needs and requirements.

Lastly, the present invention is not necessarily limited to the present embodiment, and therefore the present invention may embrace various design changes and modifications within the scope of the invention as defined in the appended claims.

What is claimed is:

1. An image processing device comprising:
    a captured-image recorder configured to record a captured image acquired from an imaging device, wherein the captured image is equally divided into a predetermined number of small areas each having a predetermined size;
    a monitor request detector configured to detect a monitor request for designating a monitored object having its characteristic information to be reflected in the captured image;
    a monitored-object specifying part configured to specify a position indicating the characteristic information of the monitored object in the captured image according to the monitor request and to thereby determine a small area corresponding to the specified position among the plurality of small areas in the captured image; and
    an output part configured to generate an output image including the small area of the monitored object in the captured image.

2. The image processing device according to claim 1, wherein the output part is configured to generate the output image based on the small area determined by the monitored-object specifying part such that the monitored object is enlarged in the captured image.

3. The image processing device according to claim 1, the output part is configured to carry out a process to obscure a different object than the monitored object reflected in its small area displayed in the output image upon setting a privacy-protection flag.

4. The image processing device according to claim 1, wherein upon receiving a plurality of monitor requests from a plurality of users, the monitored-object specifying part is configured to generate a plurality of replication data replicating the captured image according to the plurality of monitor requests such that the output part is configured to generate the output image based on each replication data among the plurality of replication data.

5. The image processing device according to claim 1, wherein when the captured image is a moving image including a plurality of still images, the output part is configured to generate the output image by combining the plurality of still images which are collected in a predetermined period to reflect the characteristic information of the monitored object, thus enlarging the monitored object in the captured image.

6. The image processing device according to claim 1, wherein the captured-image recorder records the captured image on a database in association with a user ID, the characteristic information of the monitored object according to the monitor request, and a privacy-protection flag configured to determine whether to obscure a different object than the monitored object reflected in its small area displayed in the output image.

7. An image processing method, comprising:
recording a captured image acquired from an imaging device, wherein the captured image is equally divided into predetermined number of small areas each having a predetermined size;
detecting a monitor request for designating a monitored object having its characteristic information to be reflected in the captured image;
specifying a position indicating the characteristic information of the monitored object in the captured image according to the monitor request;
determining a small area corresponding to the specified position among the plurality of small areas in the captured image; and
generating an output image representing the determined small area in the captured image.

8. The image processing method according to claim 7, wherein the captured image is recorded on a database in association with a user ID, the characteristic information of the monitored object according to the monitor request, and a privacy-protection flag configured to determine whether to obscure a different object than the monitored object reflected in its small area displayed in the output image.

9. A non-transitory computer-readable storage medium having a stored program causing a computer to implement the image processing method according to claim 7.

* * * * *